(12) United States Patent
Walsh et al.

(10) Patent No.: US 7,710,891 B2
(45) Date of Patent: May 4, 2010

(54) APPARATUS AND METHOD FOR LOW COST, MULTI-PORT PROTOCOL ANALYSIS AND MONITORING

(75) Inventors: Peter J. Walsh, Colorado Springs, CO (US); Robert Geoffrey Ward, Colorado Springs, CO (US); Roger William Ruhnow, Monument, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1537 days.

(21) Appl. No.: 11/010,259

(22) Filed: Dec. 14, 2004

(65) Prior Publication Data
US 2006/0126526 A1   Jun. 15, 2006

(51) Int. Cl.
*H04L 12/26* (2006.01)
*H04J 3/02* (2006.01)
(52) U.S. Cl. .................. 370/252; 370/395.51; 370/540; 455/67.11

(58) Field of Classification Search .................. 370/252, 370/307, 395.1, 395.51, 395.31, 436, 468, 370/503, 532–545, 241, 395.5; 398/75; 455/67.11; 709/223, 224
See application file for complete search history.

(56) References Cited

U.S. PATENT DOCUMENTS

| | | | | |
|---|---|---|---|---|
| 5,430,722 A | * | 7/1995 | Jacob et al. | 370/395.51 |
| 7,110,778 B2 | * | 9/2006 | Davis et al. | 455/456.1 |
| 2004/0024859 A1 | * | 2/2004 | Bloch et al. | 709/223 |
| 2004/0225739 A1 | | 11/2004 | Rubnow | |
| 2006/0028992 A1 | * | 2/2006 | Kangru | 370/241 |

FOREIGN PATENT DOCUMENTS

| | | |
|---|---|---|
| EP | 0726664 | 7/1999 |
| JP | 04137941 | 5/1992 |

* cited by examiner

*Primary Examiner*—Afsar M. Qureshi

(57) ABSTRACT

A concentrator multiplexes network data from different links in a network and carried on a plurality of lower speed lines into multiplexed network data carried on a higher speed line. A line interface module demultiplexes the multiplexed network data carried on the higher speed line, assembles the demultiplexed network data into cells, and reassembles cells into packets for analysis. A single distributed network analyzer analyzes the reassembled network data.

18 Claims, 7 Drawing Sheets

US 7,710,891 B2

APPARATUS AND METHOD FOR LOW COST, MULTI-PORT PROTOCOL ANALYSIS AND MONITORING

BACKGROUND OF THE INVENTION

Distributed network analyzers (DNAs) are used to analyze data from a network. Generally, DNAs receive data from a network through a line interface module (LIM). The size of a LIM, however, limits the number of inputs physically available for the LIM to receive data from a network. Therefore, a respective DNA can only receive and analyze a relatively small amount of data because of the input limitation imposed by the LIM. As a result, a plurality of LIMs and DNAs are required to analyze a large amount of data from a network.

For example, FIG. 1 is a diagram illustrating the conventional use of DNAs to receive and analyze a large amount of data from in a network. Referring now to FIG. 1, a plurality of LIMs 5, 6, 7, and 8 receive a plurality of lines 20, 21, 22, and 23, respectively, which carry data from the network. DNAs 10, 11, 12 and 13 receive data from LIMs 5, 6, 7, and 8, respectively. Typically, the data carried by lines 20, 21, 22 and 23 is from a plurality of links in the network.

It is desirable to simultaneously monitor and analyze large quantities of data from a network. However, it is expensive to use a plurality of LIMs and DNAs. Moreover, the use of a plurality of LIMs and DNAs increases the size and complexity of the total amount of required equipment. In addition, there are difficulties in coordinating monitoring and analysis of a plurality of DNAs.

It is desirable to simultaneously monitor large quantities of data at a remote location and analyze said data at a local location and use the network that is being monitored to carry said data from the remote location to the local location.

It is desirable that the analyzer be able to analyze asynchronous transfer mode (ATM) formatted data and also to perform the inverse multiplexing over ATM (IMA) function.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
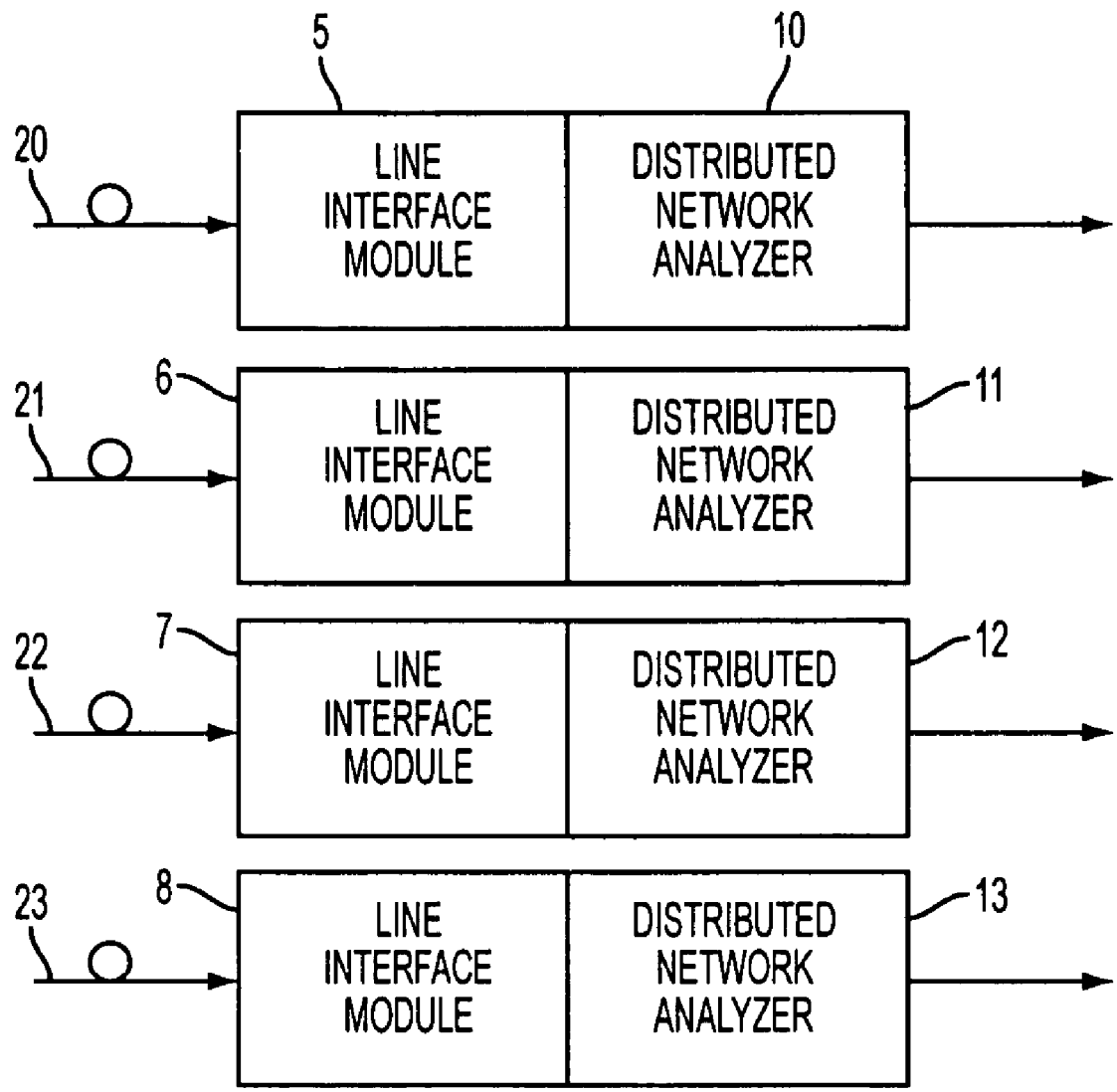
FIG. 1 (Prior Art) is a diagram illustrating the conventional use of LIMs and DNAs to receive and analyze a large amount of data from in a network.

Reference will now be made in detail to the present preferred embodiments of the present invention, examples of which are illustrated in the accompanying drawings, wherein like reference numerals refer to like elements throughout.

Figure 2:
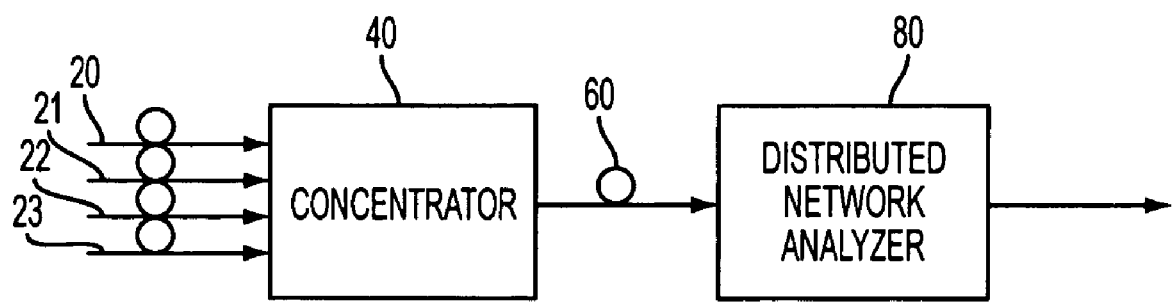
FIG. 2 is a block diagram illustrating an apparatus for concentrating a plurality of optical signals for processing by a single distributed network analyzer, according to an embodiment of the present invention.

FIG. 2 is a block diagram illustrating an apparatus for concentrating a plurality of optical signals for processing by a single distributed network analyzer, according to an embodiment of the present invention. Referring to FIG. 2, lower speed lines 20, 21, 22, and 23 carry network data from different links in a network. For example, the lower speed lines may be OC-3 lines. However, the present invention is not limited to lines being at any particular speed/rate or operating in any particular protocols.

Concentrator 40 multiplexes the network data carried by the lower speed lines 20, 21, 22, and 23 into a higher speed line 60. The higher speed line 60 has a greater bandwidth than that of the respective lower speed lines 20, 21, 22, and 23. For example, if the lower speed lines 20, 21, 22, and 23 are OC-3 lines, capable of carrying 155.52 Mbps, the higher speed line 60 may be an OC-12 line, which is capable of carrying 622.08 Mbps. However, the higher speed line 60 of the present invention is not limited to being at any particular speed/rate or operating on any particular protocol. Further, while the concentrator 40 illustrated in FIG. 2 receives 4 lower speed lines, the present invention is not limited to receiving any particular number of lines.

As illustrated in FIG. 2, the single DNA 80 then determines network statistics from the multiplexed network data carried by the higher speed line 60.

Figure 3:
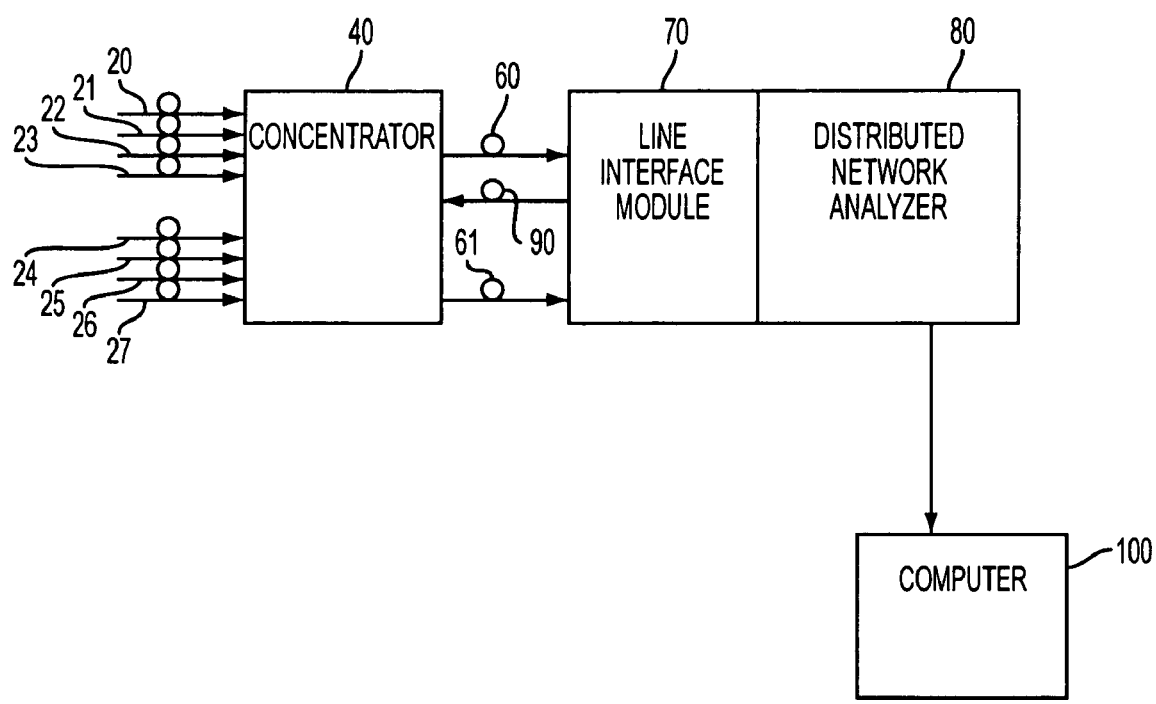
FIG. 3 is a block diagram illustrating a more detailed apparatus for concentrating a plurality of lower speed lines for processing by a single distributed network analyzer, according to embodiments of the present invention.

FIG. 3 is a block diagram illustrating a more detailed apparatus for concentrating a plurality of lower speed lines for processing by a single distributed network analyzer, according to embodiments of the present invention. Referring to FIG. 3, the plurality of lower speed lines 20, 21, 22, 23, 24, 25, 26, and 27 carry network data from different links in the network. For example, lower speed lines 20, 21, 22, 23, 24, 25, 26, and 27 may be OC-3 lines. The lower speed lines of the present invention, however, are not limited to being at any particular speed/rate or operating on any particular protocol. Additionally, while FIG. 3 illustrates eight lower speed lines, the apparatus of the present invention is not limited to any particular number of lower speed lines.

Concentrator 40 multiplexes the network data from the different links in the network carried by the lower speed lines 20, 21, 22, 23, 24, 25, 26, and 27 into higher speed lines 60 and 61, which may be OC-12 lines. Higher speed lines 60 and 61 have greater bandwidth than that of the each of the respective lower speed lines 20, 21, 22, 23, 24, 25, 26, and 27. For example, if the lower speed lines 20, 21, 22, 23, 24, 25, 26, and 27 are OC-3 lines, capable of carrying 155.52 Mbps, higher speed lines 60 and 61 may be OC-12 lines, which are capable of carrying 622.08 Mbps. However, higher speed lines 60 and 61 of the present invention are not limited to being at any particular speed/rate or operating on any particular protocol. Further, while FIG. 3 illustrates two groups of four lower speed lines being multiplexed into two higher speed lines, the present invention is not limited to any particular number of lower speed lines and higher speed lines, or any particular number of groupings.

Further, concentrator 40 may collect telemetry data from each of the respective lower speed lines 20, 21, 22, 23, 24, 25, 26, and 27. The collected telemetry data may include, for example, measurements of optical power of each of the respective lower speed lines 20, 21, 22, 23, 24, 25, 26, and 27. The collected telemetry data may also include statistics and alarms such as B1, B2, and B3 bit interleaved parity (BIP) errors, remote error indication path (REI-P) counts, loss of signal (LOS), out of frame (OOF) data, alarm indication signal line (AIS-L), remote defect indication line (RDI-L), loss of pointer (LOP), alarm indication signal path (AIS-P), and remote defect indication path (RDI-P) for each of the respective optical inputs. These statistics and alarms are well known. The telemetry data of the present invention is not limited to these statistics and alarms.

The multiplexed network data is framed in a SONET/SDH frame structure. For example, if the network data were to be multiplexed into an OC-12 line, the multiplexed network data would be framed in an OC-12 frame. The present invention, however, is not limited to using an OC-12 frame. The SONET/SDH frame structure allows for the concentrator to insert the collected telemetry data into unused overhead bytes of the SONET/SDH frame. For example, the collected telemetry data could be inserted into the overhead D1 to D6 bytes of the OC-12 frame. The present invention, however, is not limited to using the overhead D1 to D6 bytes. Further, if the network data were multiplexed into, for example, two OC-12 lines, each OC-12 line would have telemetry data relating to the network data carried by the respective OC-12 line inserted into overhead bytes of the respective OC-12 frame.

Further, a remote link 90 allows for remote control of the mapping mode of the lower speed lines 20, 21, 22, 23, 24, 25, 26, 27 using line interface module (LIM) 70. The mapping mode chosen may be, for example, virtual container 3 (VC3) or virtual container 4 (VC4). Mapping between optical protocols is well known. Additionally, the concentrator software may be upgraded using this remote link 90 from the LIM 70.

LIM 70 receives the higher speed lines 60 and 61 carrying the multiplexed network data and demultiplexes the network data. LIM 70 may then, for example, IMA on the demultiplexed network data. The LIM 70 also extracts telemetry data inserted into the overhead bytes of the SONET/SDH frame structure for processing by a computer 100. Computer 100 may be, for example, a personal computer or a handheld computer, but is not limited to any particular type of computer. LIM 70 then reassembles the ATM data into an appropriate form for processing by the single distributed network analyzer 80. Inverse multiplexing might not be required in various embodiments of the present invention.

Figure 4:
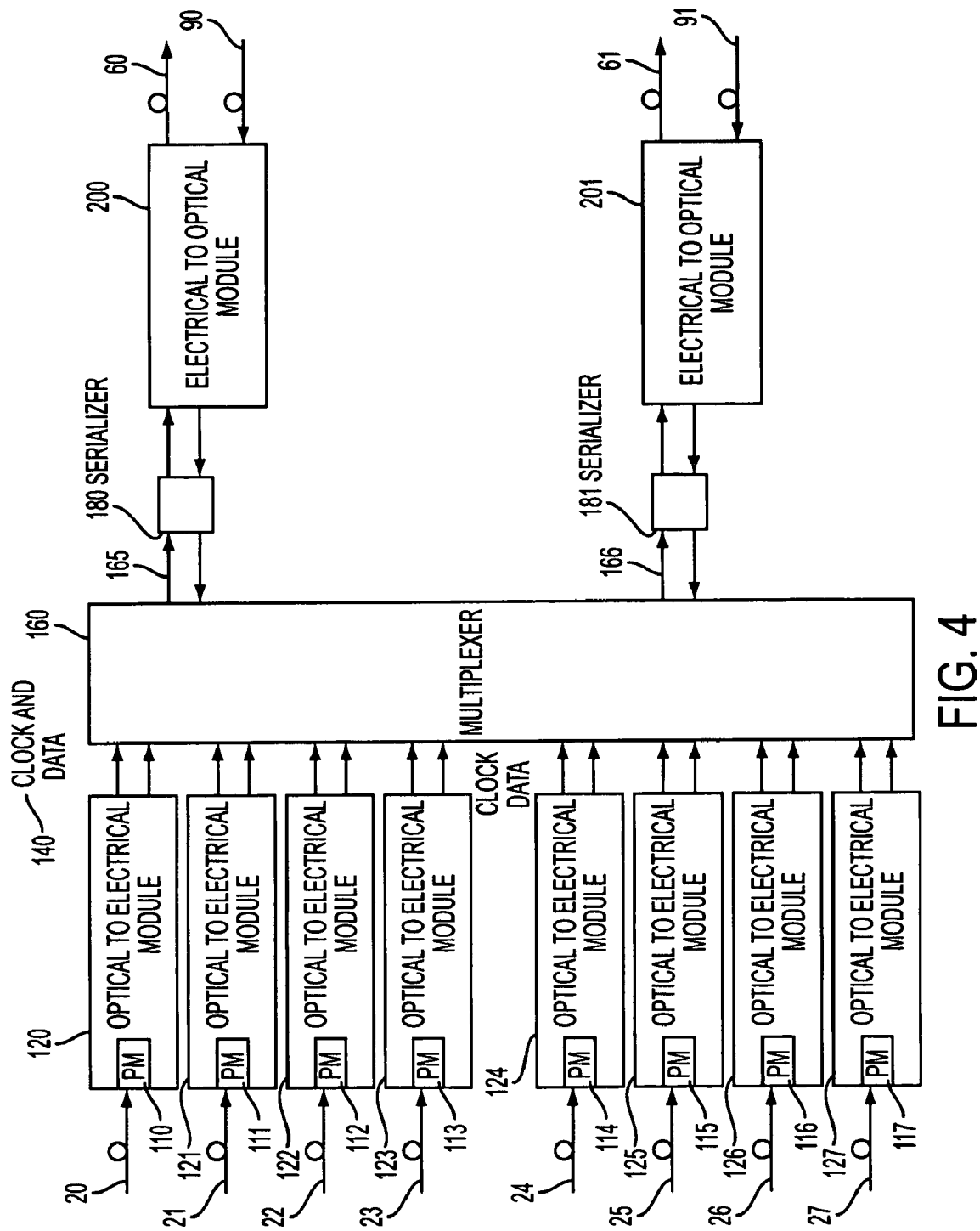
FIG. 4 is a block diagram illustrating a more detailed concentrator, according to an embodiment of the present invention.

FIG. 4 is a block diagram illustrating a more detailed concentrator 40, according to an embodiment of the present invention. As shown in FIG. 4, each of a plurality of lower speed lines 20, 21, 22, 23, 24, 25, 26, and 27 are received by optical to electrical modules 120, 121, 122, 123, 124, 125, 126, and 127, respectively. Each of the plurality of optical to electrical modules 120, 121, 122, 123, 124, 125, 126 and 127 includes an optical power meter (PM) 110, 111, 112, 113, 114, 115, 116, and 117, respectively. The optical power meters 110, 111, 112, 113, 114, 115, 116, and 117 measure the optical power of the lower speed lines 20, 21, 22, 23, 24, 25, 25, and 27, respectively. Measurement of optical power is well known. The optical power measurements are collected as a part of telemetry data. The optical power of each of the plurality of lower speed lines 20, 21, 22, 23, 24, 25, 26, and 27 is, for example, a critical level-one measurement that can indicate problems with the network. Examples of problems that a measurement of optical power in the optical to electrical modules may indicate include excessive connection losses, tampering with the connection, or degrading source laser output levels. Further, because optical power measurements are taken for each of the plurality of lower speed lines 20, 21, 22, 23, 24, 25, 26, and 27, any problems detected can be traced to the lower speed line experiencing the problem.

As indicated in FIG. 4, clock and data 140 is used to synchronize the plurality of converted electrical signals. The converted electrical signals are then multiplexed in multiplexer 160. Multiplexer 160 frames the multiplexed data in a synchronous optical network (SONET)/synchronous digital hierarchy (SDH) frame structure. The SONET/SDH frame structure allows for the multiplexer to insert the collected telemetry data into unused overhead bytes of the frame structure. Accordingly, both the multiplexed network data and the telemetry data 250 corresponding the multiplexed network data can be carried by the same higher speed line.

FIG. 4 illustrates multiplexing two groups of four lower speed lines. For example, FIG. 4 illustrates a first group of lower speed lines 20, 21, 22, and 23 being multiplexed into a SONET/SDH electrical signal 165 and a second group of lower speed lines 24, 25, 26, and 27 being multiplexed into SONET/SDH electrical signal 166. SONET/SDH electrical signals 165 and 166 are then serialized in serializers 180 and 181, respectively. The SONET/SDH electrical signals 165 and 166 are serialized so that the data carried by each of the SONET/SDH electrical signals can be carried by two optical fibers 60 and 61, respectively. The serialized electrical signals 165 and 166 are then converted from SONET/SDH electrical signals to optical signals in electrical to optical modules 200 and 201, respectively.

The higher speed lines 60 and 61, which may be OC-12 lines, then carry network data previously carried by the plurality of lower speed lines 20, 21, 22, 23, 24, 25, 26, and 27, such as OC-3 lines, and the inserted telemetry data. The higher speed lines 60 and 61 have greater bandwidth than that of the lower speed lines 20, 21, 22, 23, 24, 25, 26, and 27. For example, if the optical inputs 20, 21, 22, 23, 24, 25, 26, and 27 are OC-3 lines, each capable of carrying 155.52 Mbps, the higher speed lines 60 and 61 may be OC-12 lines, which are capable of carrying 622.08 Mbps. However, the higher speed lines 60 and 61 of the present invention are not limited to OC-12 lines.

As also indicated in FIG. 4, the remote link 90 allows for remote control of the mapping mode of the lower speed lines 20, 21, 22, 23, 24, 25, 26, and 27 using LIM 70. The mapping mode chosen may be, for example, virtual container 3 (VC3) or virtual container 4 (VC4). However, the present invention is not limited to any particular mapping mode. Mapping between optical protocols is well known. Additionally, the concentrator 40 software may be upgraded using this remote link 90 from the LIM 70.

Figure 5:
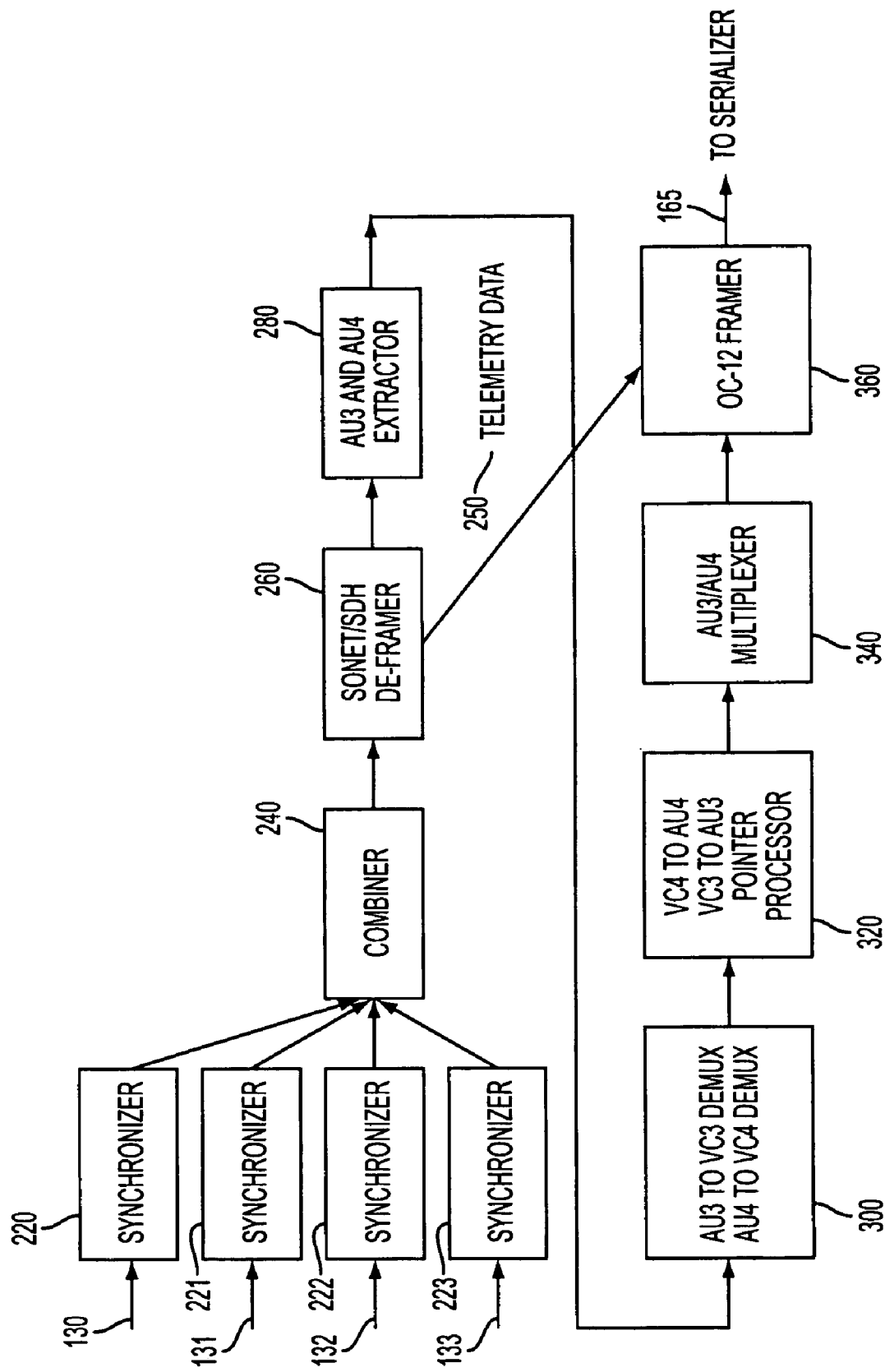
FIG. 5 is a block diagram illustrating a more detailed multiplexer, according to an embodiment of the present invention.

FIG. 5 is a block diagram illustrating a more detailed multiplexer 160, according to an embodiment of the present invention. In the present invention, the multiplexer 160 is a field programmable gate array (FPGA). The multiplexer 160 of the present invention, however, is not limited to a FPGA.

The multiplexer 160 receives SONET/SDH electrical signals 130, 131, 132, and 133 from optical to electrical modules 120, 121, 122, and 123, respectively. For example, if the present invention were to multiplex eight lower speed lines, the structure of the multiplexer 160 shown in FIG. 5 would be repeated to accommodate additional lower speed lines. The multiplexer of the present invention is not limited to multiplexing a specific number of lower speed lines.

Synchronizers 220, 221, 222, and 223 then synchronize the SONET/SDH electrical signals 130, 131, 132, and 133 according to the local clock domain. Synchronization of the SONET/SDH electrical signals is known in the art. The synchronized SONET/SDH electrical signals 130, 131, 132, and 133 are then interleaved into a single data stream in combiner 240. The process of interleaving synchronized SONET/SDH electrical signals is well known. Because the SONET/SDH electrical signals 130, 131, 132, and 133 are combined into a single data stream, processing is more cost effective.

The SONET/SDH de-framer 260 detects the framing pattern of the data stream, which identifies the SONET/SDH payload carried by the data stream. SONET/SDH framing patterns and the process of detecting SONET/SDH framing patterns are well known. Further, the SONET/SDH de-framer 260 detects statistics and alarms such as B1, B2, and B3 bit interleaved parity (BIP) errors, remote error indication path (REI-P) counts, loss of signal (LOS), out of frame (OOF) data, alarm indication signal line (AIS-L), remote defect indication line (RDI-L), (LOP), alarm indication signal path (AIS-P), and remote defect indication path (RDI-P) for each of the respective lower speed lines. These statistics and alarms are well known, and are included in the telemetry data 250.

If the SONET payload detected by SONET/SDH de-framer 260 is AU3, for example, the AU3 and AU4 extractor 280 extracts the AU3 payload from the SONET frame. If the SONET payload detected is AU4, the AU3 and AU4 extractor 280 extracts the AU4 payload from the SONET frame.

The AU3 to VC3/AU4 to VC4 demultiplexer 300 uses pointer processing to retrieve the number of synchronous payload envelopes (SPEs) appropriate for the detected framing pattern. The VC4 to AU4/VC3 to AU3 pointer processor 320 then packs the retrieved SPEs into AU3 or AU4 payloads, as determined by the detected framing pattern, that are synchronized to the outgoing higher speed electrical signal 165. The synchronized AU3 or AU4 payloads are then interleaved into a single data stream in AU3/AU4 multiplexer 340.

The framer 360 puts an appropriate SONET/SDH frame around the multiplexed AU3/AU4 payloads. The SONET/SDH frame is not limited to an OC-12 frame. Further, the SONET/SDH frame has unused overhead bytes. The telemetry data 250 collected is inserted into, for example, the D1 to D6 overhead bytes by the framer 360. The telemetry data 250 is not limited to the D1 to D6 overhead bytes of the SONET/SDH frame structure.

FIG. 5 shows a deframer, extractor, demultiplexer, pointer processor, multiplexer, and framer illustrated in specific SONET/SDH protocols. However, the present invention is not limited to the deframer, extractor, demultiplexer, pointer processor, multiplexer, and framer being based in any specific protocol.

Figure 6:
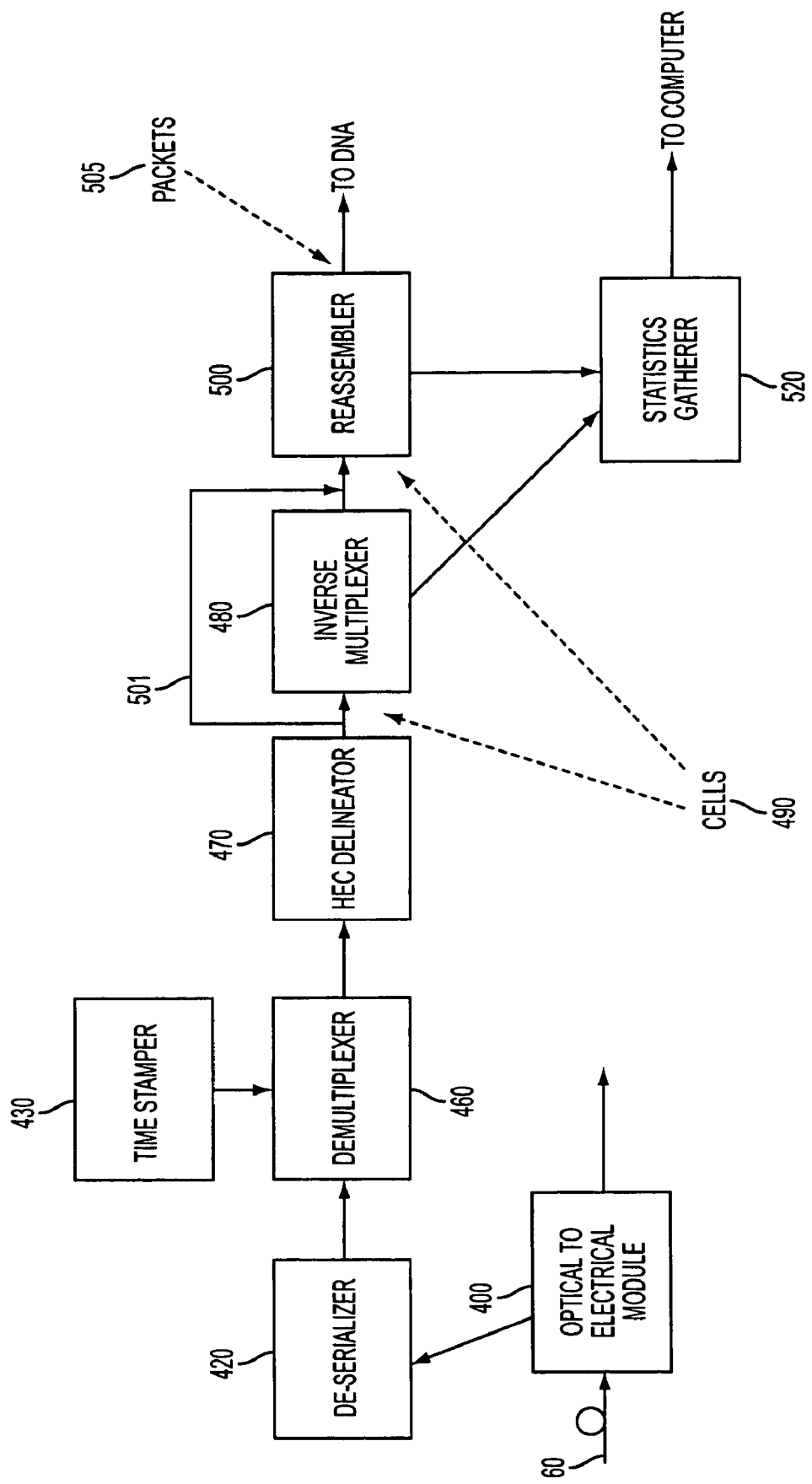
FIG. 6 is a block diagram illustrating a more detailed line interface module (LIM), according to an embodiment of the present invention.

FIG. 6 is a block diagram illustrating a more detailed line interface module (LIM), according to an embodiment of the present invention. While FIG. 6 illustrates a LIM 70 suited to receive a single higher speed line 60, the LIM 70 of the present invention is not limited to receiving a single higher speed line. For example, if higher speed lines 60 and 61 were received from concentrator 40, the structure illustrated in FIG. 6 would be duplicated to accommodate two higher speed lines.

The higher speed optical line 60 is input into optical to electrical module 400 of the LIM 70, which converts the signal carried by higher speed optical line into an electrical signal. Deserializer 420 then deserializes the converted electrical signal. Demultiplexer 460 then demultiplexes the deserialized electrical signal. The demultiplexed signal represents the network data in its original form, as carried by the lower speed lines 20, 21, 22, and 23. Further, the demultiplexed signal may be time stamped by time stamper 430. Time stamping, however, is not required. HEC delineator 470 then arranges the demultiplexed signal, for example, into 53 byte cells 490, as illustrated in FIG. 6.

As also indicated in FIG. 6, inverse multiplexer 480 may inverse multiplexes the demultiplexed cells. For example, the demultiplexed network data may be inverse multiplexed over asynchronous transfer mode, which is a process also known as IMA. The present invention, however, is not limited to IMA or ATM, which are well known processes. If IMA occurs, the data will remain in 53 byte cells. Further, inverse multiplexing may not occur at all, as indicated by bypass line 501 in FIG. 6. Reassembler 500 then reassembles the inverse multiplexed data or, if the inverse multiplexer 480 is bypassed or not provided, the cells from the HEC delineator, into packets 505 in reassembler 500. Reassembler 500 reassembles the 48-byte payloads of the 53-byte cells into packets 505 using an ATM adaptation layer protocol (AAL), such as AAL-2 or AAL-5. This protocol is well known. The present invention however is not limited to this protocol. Further, the length of the reassembled packets 505 may vary. These reassembled packets 505 can then be analyzed by DNA 80.

Additionally, in the LIM 70, the telemetry data 250 inserted in the overhead bytes of the SONET/SDH frame is extracted and gathered by statistics gatherer 520. Statistics gathered by statistics gatherer 520 are processed by computer 100. Computer 100 may be, for example, a personal computer or a handheld computer, and is not limited to any particular type of computer.

Figure 7:
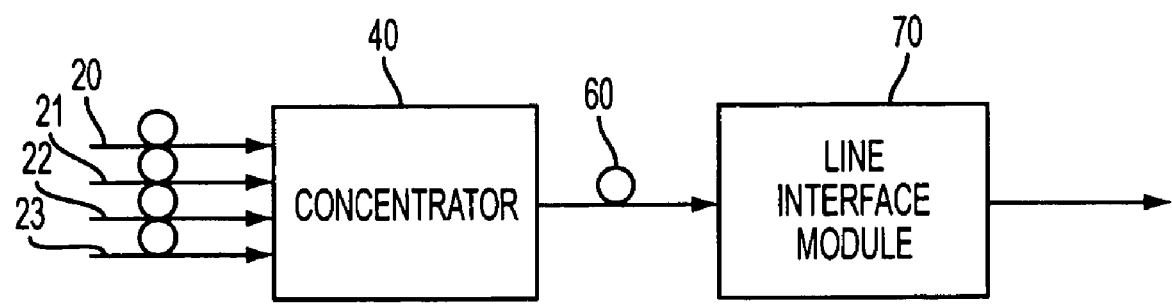
FIG. 7 is a block diagram illustrating an apparatus for concentrating a plurality of optical signals for processing by a single distributed network analyzer, according to an embodiment of the present invention.

FIG. 7 is a block diagram illustrating an apparatus for concentrating a plurality of optical signals for processing by a single distributed network analyzer, according to an embodiment of the present invention. As shown in FIG. 7, the apparatus includes a concentrator 40, which receives a plurality of lower speed lines 20, 21, 22, and 23, and a line interface module 70. Concentrator 40, shown in greater detail in FIG. 3, multiplexes data from different links in a network and carried on a plurality of lower speed lines 20, 21, 22, and 23 into multiplexed network data carried on a higher speed line 60. LIM 70, shown in greater detail in FIG. 4, demultiplexes the multiplexed network data, packages the demultiplexed network data into cells, and reassembles the cells network data for analysis by a single distributed network analyzer 80.

According to the above, the present invention provides a method for concentrating a plurality of network data from different links in a net work carried on a plurality of lower speed lines into multiplexed network data carried on a higher speed line, deconstructing the multiplexed network data, and simultaneously analyzing the network data from different links with a single distributed network analyzer using the deconstructed network data.

The present invention allows for remote placement of concentrator 40, so long as it is connectable to LIM 70 or DNA 80 via a higher speed line 60, such as an OC-12 line. Further, since less equipment is necessary to simultaneously analyze a plurality of optical inputs, the present invention allows for low cost, multi-port protocol analysis and monitoring. Further, the present invention allows for analysis and monitoring of multiple optical inputs using an existing DNA, thus adding flexibility to an existing analysis and monitoring system.

Various protocols and standards have been described herein. However, the present invention is not limited to any specific protocols and/or standards.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus, comprising:
   a concentrator multiplexing network data from different links in a network and carried on a plurality of lower speed lines into multiplexed network data carried on a higher speed line; and
   a distributed network analyzer determining network statistics from the multiplexed network data carried by the higher speed line, wherein the concentrator inserts telemetry data relating to the network data carried by each of the plurality of lower speed lines into overhead bytes of the higher speed line carrying multiplexed network data.

2. An apparatus as in claim 1, further comprising a line interface module demultiplexing the multiplexed network data carried by the higher speed line, assembling the demultiplexed network data into cells, and reassembling the cells into packets for analysis by a single distributed network analyzer.

3. An apparatus as in claim 2, further comprising a remote link with the concentrator controlling a mapping mode of the lower speed lines.

4. An apparatus as in claim 2, wherein the line interface module comprises:
   an optical to electrical module converting the multiplexed network data carried by the higher speed line to an electrical signal;
   a deserializer deserializing the multiplexed network data;
   a demultiplexer demultiplexing the deserialized network data;
   a HEC delineator assembling the demultiplexed network data into cells;
   a reassembler reassembling the cells into packets for analysis by a single network analyzer; and
   a statistics gatherer extracting the telemetry data from the overhead bytes of the SONET frame for analysis by a computer.

5. An apparatus as in claim 2, further comprising inverse multiplexing the demultiplexed network data before assembling the demultiplexed network data into cells.

6. An apparatus as in claim 1, wherein the concentrator comprises:
   a plurality of optical to electrical modules which convert the network data from the plurality of lower speed lines, respectively, into electrical signals, each optical to electrical module including an optical power meter that collects telemetry data from the network data;
   a multiplexer multiplexing the converted network data into multiplexed network data, framing the multiplexed network data in a SONET/SDH frame structure, and inserting the telemetry data collected by the optical power meters and additional telemetry data collected by the multiplexer into overhead bytes of the SONET/SDH frame structure;
   a serializer serializing the framed multiplexed network data having inserted telemetry data; and
   an electrical to optical module converting the serialized data into an optical signal, the optical signal being the multiplexed network data carried on the higher speed line.

7. An apparatus as in claim 1, wherein the concentrator includes software for multiplexing the network data, said software being upgradeable through a remote optical link.

8. An apparatus as in claim 1, wherein the concentrator is located remotely, the multiplexed network data is carried by the network, and the distributed network analyzer is located locally.

9. An apparatus comprising:
   a concentrator multiplexing network data from different links in a network and carried on a plurality of lower speed lines into multiplexed network data carried on a higher speed line; and
   a line interface module demultiplexing the multiplexed network data carried on the higher speed line, assembling the demultiplexed network data into cells, and reassembling the cells into packets for analysis by a single distributed network analyzer, wherein the concentrator inserts telemetry data relating to the network data carried by each of the plurality of lower speed lines into overhead bytes of the higher speed line carrying the multiplexed network data.

10. An apparatus as in claim 9, wherein the line interface module extracts the telemetry data from the higher speed line for processing by a computer.

11. An apparatus as in claim 9, further comprising a distributed network analyzer analyzing the reassembled network data.

12. An apparatus as in claim 9, further comprising a remote link with the concentrator controlling a mapping mode of the lower speed lines.

13. An apparatus as in claim 9, wherein the concentrator comprises:
   a plurality of optical to electrical modules converting the network data from the plurality of lower speed lines, respectively, into electrical signals, each optical to electrical module including an optical power meter that collects telemetry data from the network data;
   a multiplexer multiplexing the converted network data into multiplexed network data, framing the multiplexed network data in a SONLT/SDH frame structure, and inserting the telemetry data collected by the optical power meters and additional telemetry data collected by the multiplexer into overhead bytes of the SONLT/SDH frame structure;
   a serializer serializing the framed multiplexed network data having inserted telemetry data; and
   an electrical to optical module converting the serialized data into an optical signal, the optical signal being the multiplexed network data carried on the higher speed line.

14. An apparatus as in claim 9, wherein the line interface module comprises:
   an optical to electrical module converting the multiplexed network data carried by the higher speed line to an electrical signal;
   a deserializer deserializing the multiplexed network data;
   a demultiplexer demultiplexing the deserialized network data;
   a HEC delineator assembling the demultiplexed network data into cells;
   a reassembler reassembling the cells into packets for analysis by a single network analyzer; and
   a statistics gatherer extracting the telemetry data from the overhead bytes of the SONET frame for analysis by a computer.

15. An apparatus as in claim 9, wherein the concentrator includes software for multiplexing the network data, said software being upgradeable through a remote optical link.

16. An apparatus as in claim 9, further comprising inverse multiplexing the demultiplexed network data before assembling the demultiplexed network data into cells.

17. A method comprising:
concentrating, by a concentrator, a plurality of network data from different links in a network carried on a plurality of lower speed lines into multiplexed network data carried on a higher speed line;
deconstructing the multiplexed network data carried on the higher speed line;
and simultaneously analyzing the network data from the different links with a single distributed network analyzer using the deconstructed network data, wherein said concentrating comprises:
collecting telemetry data from each of the plurality of lower speed lines; and
multiplexing the network data from the different links into multiplexed network data in a SONET frame structure, and inserting the collected telemetry data from each of the plurality of lower speed lines into overhead bytes of the SONET frame structure.

18. A method as in claim 17, wherein said deconstructing comprises:
demultiplexing the multiplexed network data;
assembling the demultiplexed network data into cells;
extracting the telemetry data from the overhead bytes of the SONET frame structure for analysis by a computer; and
reassembling the cells into packets for analysis by the single distributed network analyzer.

* * * * *

UNITED STATES PATENT AND TRADEMARK OFFICE
CERTIFICATE OF CORRECTION

PATENT NO. : 7,710,891 B2  
APPLICATION NO. : 11/010259  
DATED : May 4, 2010  
INVENTOR(S) : Peter J. Walsh et al.

Page 1 of 1

It is certified that error appears in the above-identified patent and that said Letters Patent is hereby corrected as shown below:

Col. 8, line 38, in claim 13, delete "SONLT/SDH" and insert -- SONET/SDH -- therefor.

Col. 8, line 41, in claim 13, delete "SONLT/SDH" and insert -- SONET/SDH -- therefor.

Signed and Sealed this  
First Day of January, 2013

David J. Kappos  
*Director of the United States Patent and Trademark Office*